United States Patent [19]

Harrison

[11] Patent Number: 4,909,670

[45] Date of Patent: Mar. 20, 1990

[54] SUBMARINE PIPELINE SPAN CORRECTION BY LOCAL AXIAL TENSION RELEASE

[75] Inventor: Gary E. Harrison, Katy, Tex.

[73] Assignee: McDermott International Inc., New Orleans, La.

[21] Appl. No.: 390,017

[22] Filed: Aug. 7, 1989

[51] Int. Cl.⁴ .............................................. F16L 1/04
[52] U.S. Cl. .................................... 405/168; 405/165; 405/158; 405/171; 405/172; 405/173; 254/134.35 C
[58] Field of Search ............... 405/158, 168, 162, 165, 405/166, 171, 172, 173; 254/134.35 C, 134.3 R; 166/338, 341

[56] References Cited

U.S. PATENT DOCUMENTS

| | | | |
|---|---|---|---|
| 26,677 | 1/1860 | Horstmann | 405/171 |
| Re. 28,410 | 5/1975 | Cox et al. | 405/168 |
| 66,613 | 7/1867 | Morse et al. | 405/171 |
| 4,062,198 | 12/1977 | Lamy | 405/171 |
| 4,063,430 | 12/1977 | Lamy | 405/172 X |
| 4,110,994 | 9/1978 | Lundh | 405/158 |
| 4,415,764 | 11/1983 | Priaroggia et al. | 405/158 X |
| 4,498,812 | 2/1985 | Lanfranconi et al. | 405/168 |
| 4,755,947 | 7/1988 | Braschler | 405/168 X |

FOREIGN PATENT DOCUMENTS

| | | | |
|---|---|---|---|
| 2386757 | 12/1978 | France | 405/158 |
| 614279 | 7/1978 | U.S.S.R. | 405/158 |
| 1520 | 7/1858 | United Kingdom | 405/166 |

Primary Examiner—Randolph A. Reese
Assistant Examiner—J. Russell McBee
Attorney, Agent, or Firm—Robert J. Edwards; Michael L. Hoelter

[57] ABSTRACT

A method of locally supplying slack to an axially tensioned length of pipeline spanning unsupported across an undulating seabed. During pipeline deployment, the pipeline is fitted with two weighted masses that will be positioned on either side of the undulation to be spanned. These masses will be spaced a predetermined distance from each other along the seabed, this distance being less than that between them along the pipeline. Also during deployment, the mid-region of this span is vertically deflected upward while retaining the axial tension in the pipeline. Once the pipeline is properly positioned, the vertical deflection of the pipeline is reduced thereby relieving the axial tension in the pipeline while also introducing sufficient pipeline slack such that the pipeline can closely follow the contours of the undulating seabed.

12 Claims, 6 Drawing Sheets

SUBMARINE PIPELINE SPAN CORRECTION BY LOCAL AXIAL TENSION RELEASE

FIELD OF THE INVENTION

This invention pertains to a method of laying pipeline in a marine environment and more particularly to a method that reduces the axial tension in the laid pipeline thereby reducing and/or eliminating the occurrence of unsupported span lengths while enabling the pipeline to closely conform to the contours of the seabed.

BACKGROUND OF THE INVENTION

Using a laybarge to lay pipeline in a marine environment is a common occurrence. Further use of pipeline stingers to guide and support the pipeline before it is possitioned on or in the seabed is also of great assistance in this venture. During the laying operation, the pipeline becomes axially tensioned for several reasons. The primary reason is the need to control the bending stresses in the overbend and sagblend pipeline segments relative to the stinger.

Since the pipeline is continuously tensioned along the entire installation route, it retains all or a portion of this axial tension after being installed. Such 'residual axial tension' is maintained in the pipeline because of the distributed friction forces between the pipeline and the adjacent seabed. Ordinarily such residual axial tension is of little consequence, however, should the pipeline be laid over an undulating seabed, the pipeline has a tendency to span over such undulations.

When the span length is small relative to pipeline diameter, the concern is minimal, but when the span length approaches or exceeds the regulatory standard of 75 to 150 feet, corrections and/or adjustments must be made. In fact, should these regulatory limits be exceeded, the unsupported pipeline span must be reduced otherwise there is risk of rupture or other physical damage to the pipeline.

The current practice, when an excessive length span occurs, is to use divers to erect underwater supports for the pipeline. One method of accomplishing this requires the diver to regularly insert grout bags underneath the laid pipe to provide support. Another method entails the use of structural supports that the diver must install along the unsupported span. These practices are feasible provided the diver can work for long periods at the necessary depth. Also, the remedial use of these supports becomes economically prohibitive should the span be lengthy or should the pipeline be more than 3 to 4 feet above the seabed.

Another alternative for providing pipeline support is the utilization of remotely operated vehicles (ROV's) to construct the needed supports. Such ROV span corrections, however, will be limited by the capabilities of the ROV to erect the pipeline support beneath the pipeline.

It is thus an object of this invention to provide a method of laying pipeline in a marine environment in such a manner that local 'residual axial tension' is either eliminated or severely reduced. Another object of this invention is to provide a method that is considerably easier to deploy and much more economical than any of the methods now being utilized. A further object of this invention is to provide post-installation construction procedures that reduce or eliminate any excessive pipeline spanning that would otherwise occur over an undulating seabed. Yet another object of this invention is to enable an underwater pipeline to conform to the variable contours of the seabed with little or no spanning. These and other objects will become obvious upon further investigation of this invention.

SUMMARY OF THE INVENTION

This invention pertains to a method of locally supplying slack to an axially tensioned underwater pipeline while it is being deployed. The affected section spans unsupported across an undulating seabed with the mid-region of this unsupported span being temporarily deflected vertically above the seabed. This vertical deflection is maintained, temporarily, in the presence of the residual axial tension normally found in the pipeline. Opposite ends of this span are anchored due to friction between the seabed and the pipeline on opposite sides of the undulation to be crossed. The point along the pipeline on either side of the span at which friction totally restrains the residual axial tension is termed the 'virtual anchor' position. This 'virtual anchor' position will typically be several thousand feet from the span center. After the introducing of slack, the distance between these virtual anchor positions along the seabed is less than the distance between them along the tensioned pipeline. Once properly anchored, the vertical deflection of the mid-region is reduced to zero thereby releasing the axial tension in this span while also introducing slack to the pipeline between its anchored positions.

In one embodiment, a first weighted mass is attached to the pipeline adjacent one end region of the span and a second weighted mass is attached to the pipeline adjacent the opposite end region of the span. Generally, buoys are secured to these weighted masses during deployment to temporarily offset the additional forces incurred by the pipeline due to the attachment of these weighted masses. Intermediate these weighted masses, a buoyant member is attached to a mid-region of the span with this buoyant member suspending and vertically deflecting this mid-region above the seabed. This vertical deflection maintains, temporarily, the axial tension in the pipeline. Once the pipeline is properly anchored, the buoyancy of the buoyant member is reduced, thereby relieving the axial tension in the deflected pipeline while also supplying sufficient slack to this span such that the pipeline is able to closely follow the contours of the undulating seabed.

DETAILED DESCRIPTION OF THE DRAWINGS

Figure 1:
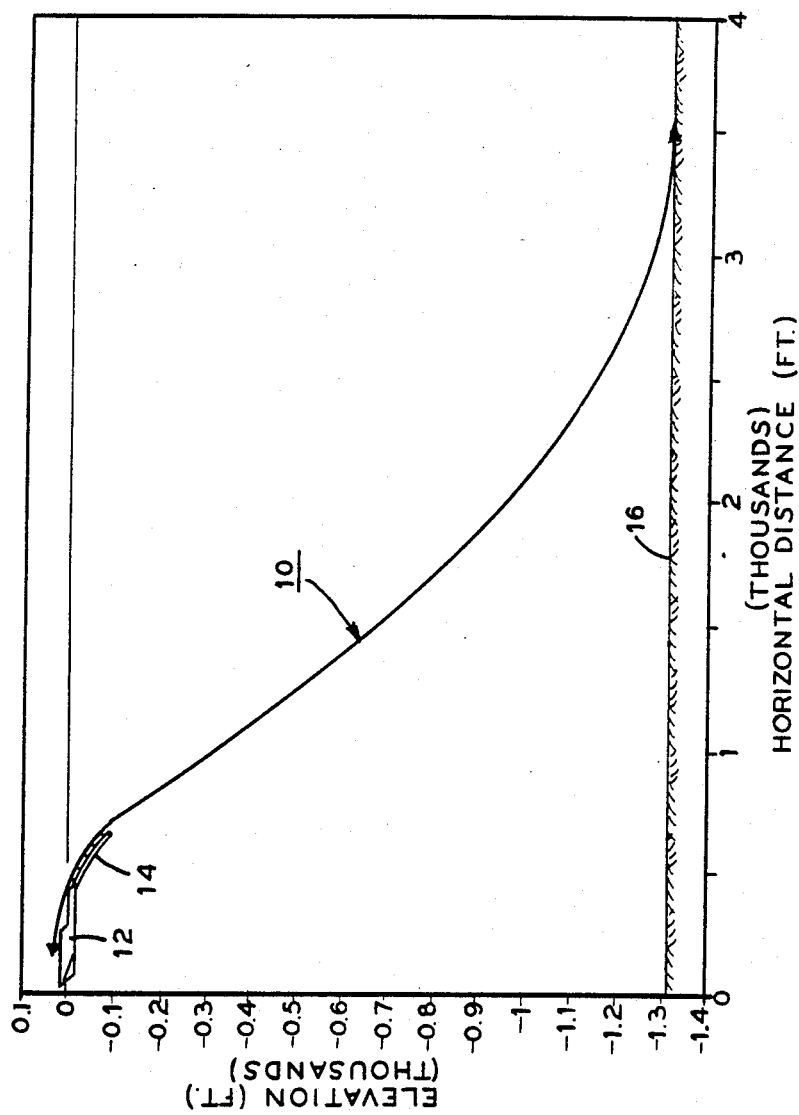
FIG. 1 is a side pictorial view of the laybarge method of underwater pipeline installation.

Referring initially to FIG. 1, there is shown the typical method of laying underwater pipeline 10. In the manner depicted, pipeline 10 is laid from laybarge 12 and pulled through stinger 14 before being laid across seabed 16. Because pipeline 10 is pulled from laybarge 12 and is under tension as it is positioned across seabed 16, a certain amount of axial tension resides in pipeline 10. This residual axial tension remains in the pipeline and is not released due to the abundant friction force on pipeline 10 from seabed 16 in addition to the fact that the forward progress of laybarge 12 keeps constant tension on pipeline 10.

Normally, this residual axial tension is of little concern; however, if pipeline 10 must be laid over an undulating seabed 16 (FIG. 2), this tension significantly increases the tendency of pipeline 10 to span over such undulations. The ideal situation is one where pipeline 10 conforms rather closely to the contours of seabed 16 as shown in FIG. 3 with no residual axial tension. To accomplish this, the axial tension causing pipeline 10 to span across such undulations must be relieved. This is especially true if the span exceeds the regulatory standards and good construction practices that typically specify a maximum unsupported span length of 75 to 150 feet (depending upon pipeline diameter).

To relieve the axial tension where desired, it becomes important to selectively introduce slack into pipeline 10 as needed. The amount of slack required varies from a few inches to several feet depending on the undulation across which pipeline 10 spans. Also important is the size, weight and other physical characteristics of both pipeline 10 and seabed 16.

Figure 3:
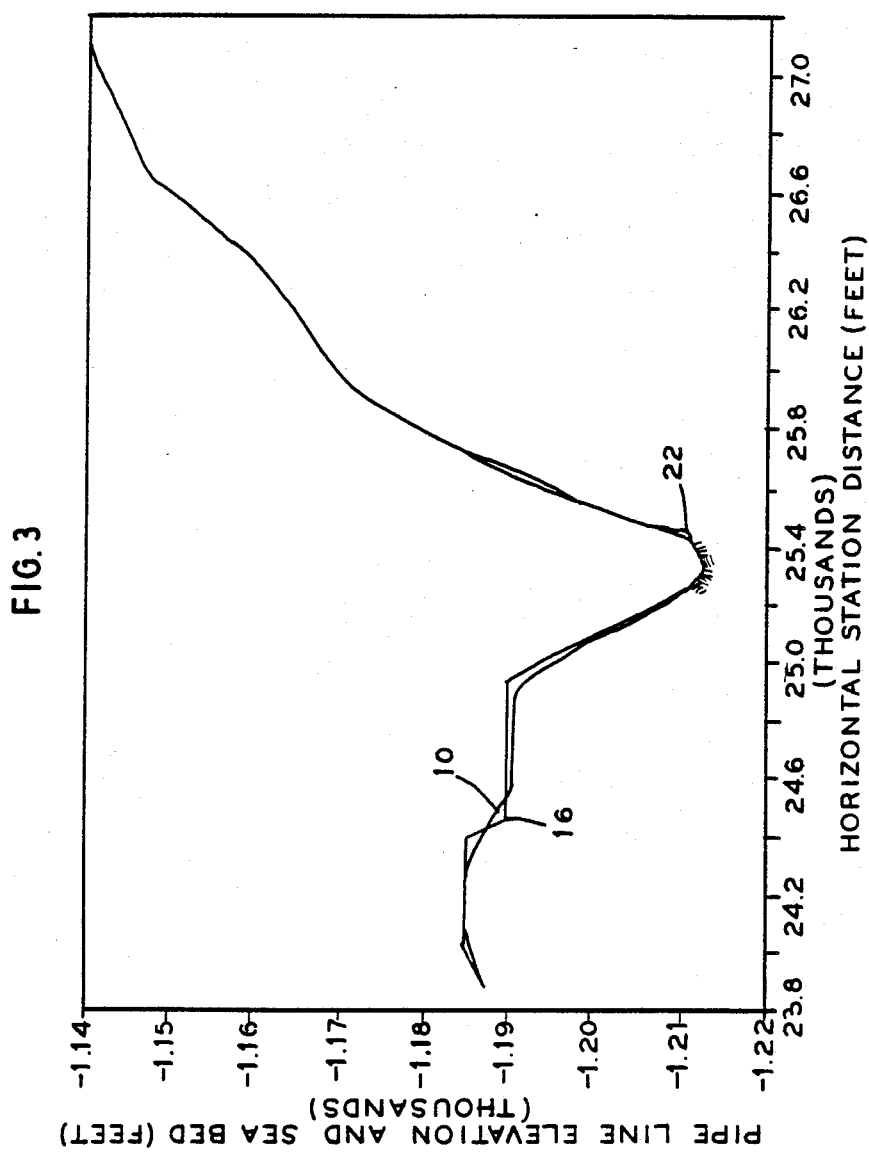
FIG. 3 is a side pictorial view of a preferred non-tensioned pipeline installation over an undulating seabed.
Figure 4:
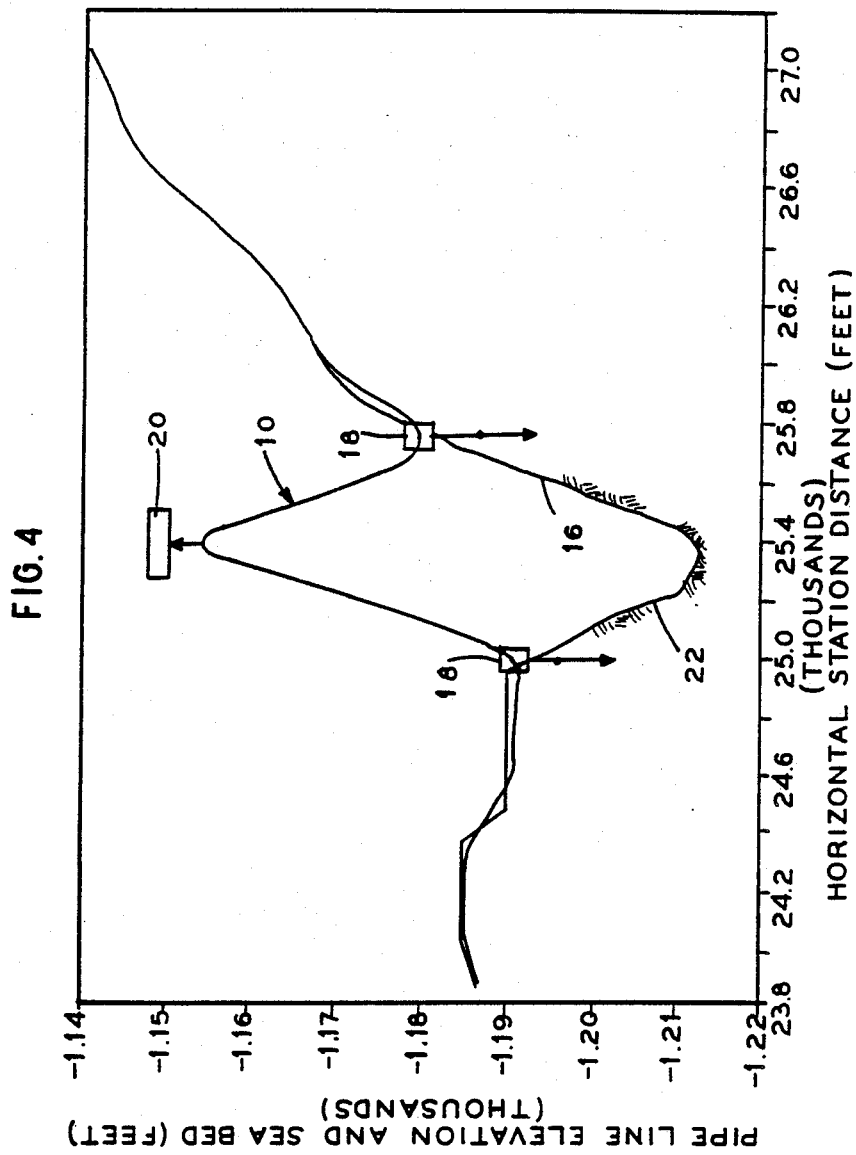
FIG. 4 is a side pictorial view of the applicants' method of laying underwater pipe over an undulating seabed.

Referring now to FIG. 4, slack to be used for local residual axial tension relief is introduced during pipeline laybarge installation by effecting a localized vertical plane deflection. Such deflection is pre-calculated to be of adequate curvature and length so as to locally increase pipeline length by a pre-determined amount. This vertical deflection is maintained in the presence of the normal axial tension residing in pipeline 10. The amount of slack required to relieve this residual axial tension is that amount over what would be the case if the vertical plane deflection were not imposed on pipeline 10. In other words, the slack required to locally release the residual axial tension is the difference between the pipeline arc lengths of FIG. 2 and that of FIG. 3, plus an additional length to compensate for shrinkage of pipeline 10 from its 'stretched' length. Such slack requirements are calculated from structural pipeline model computer simulations and direct integration of the strain state (after tension relate) of pipeline 10 from the center of the span crossing to the 'virtual anchor' position on either side of the span. This 'virtual anchor' position is the point where the pipeline-to-seabed friction completely restrains the axial tension to be relieved. In the example cited below, the total slack required including the difference in arc lengths of the tensioned and relaxed pipeline 10 is approximately 2 feet.

Local vertical plane deflection is achieved by installing, during pipeline installation, two 'extra weight' joints or two weighted masses 18 to pipeline 10 on either side of the undulation to be crossed. These weighted masses 18 are approximately equal distance from buoy 20 which generally is secured to a mid-region of the pipeline span. Buoy 20 is generally sized to have a net buoyancy approximately equal to the weight of both weighted masses 18. The combination of buoy 20 and weighted masses 18 and spacing of same on opposite sides of the undulation to be crossed, minimizes the vertical deflection required to achieve the desired amount of slack.

When installed on pipeline 10 during laybarge operation, weighted masses 18 and buoy 20 result in a local, vertical deflection of pipeline 10 above seabed 16 as shown in FIG. 4. This deflection is achieved in the presence of the expected level of residual axial tension and within typical bending stress limitations imposed on marine pipeline installations. By proper selection of the extra weight, buoyancy, and spacing of masses 18 from buoy 20, a pre-determined amount of slack can be supplied to pipeline 10.

After vertically deflecting pipeline 10, normal pipeline installation procedures continue until pipeline 10 becomes effectively anchored on both sides of the deflection by friction of the pipeline with the seabed. At that stage, buoy 20 is released thereby introducing slack to and releasing the axial tension in pipeline 10. Such local reduction of residual axial tension in pipeline 10 enables it to closely conform to the contours of any undulating seabed 16.

A specific example of this invention is as follows.

Figure 2:
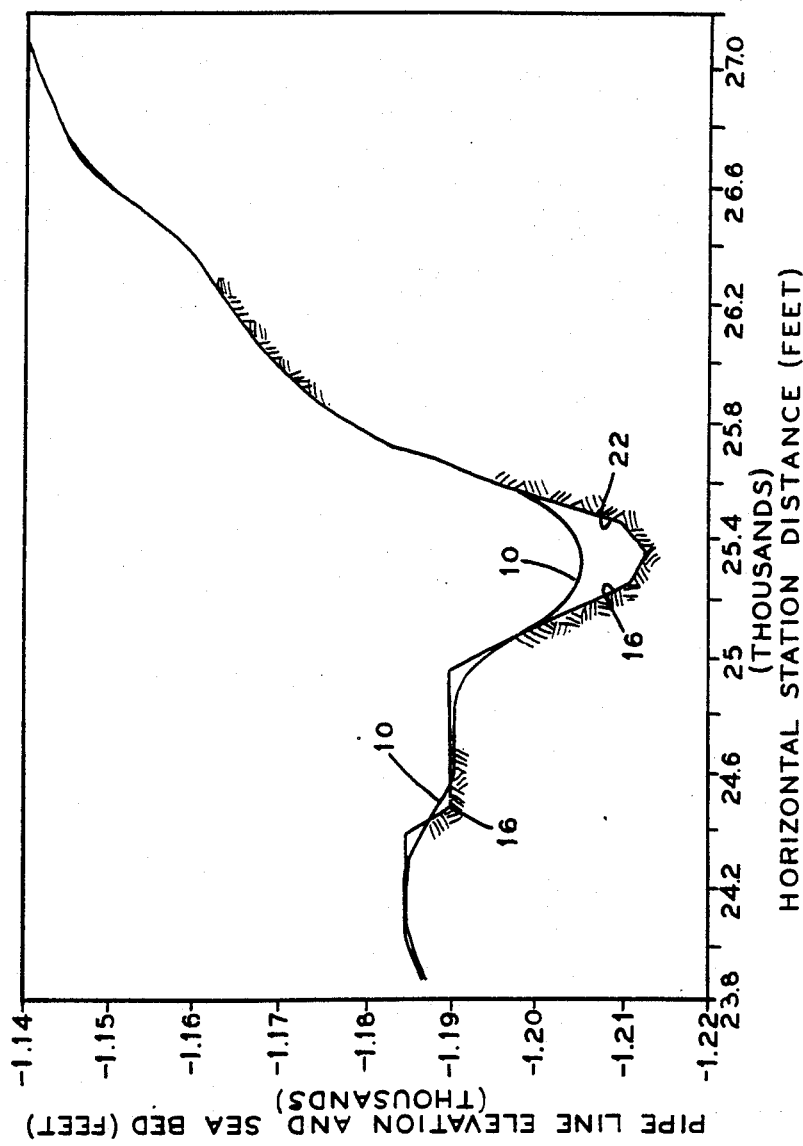
FIG. 2 is a side pictorial view of a typical underwater pipeline installation over an undulating seabed with the pipeline being axially tensioned, the difference betwen the pipeline location and the seabed is illustrated.

In FIG. 2, the residual axial tension in 20 inch diameter pipeline 10 causes it to span across undulation 22 as shown. This undulation 22 is approximately 550 feet in length with pipeline 10 being approximately 9 feet above seabed 16 (the drawing's vertical scale is exaggerated). FIG. 3 depicts the same undulation 22 and pipeline 10 except that in this figure, the axial tension has been released by the method described herein. The amount of slack necessary to compensate for 'shrinkage' and conformance to the seabed contour of pipeline 10 is approximately two feet.

Calculations are performed with computer simulations of structural pipeline models to determine the additional weight required to enhance slack created in pipeline 10 as well as the buoyancy necessary to lift pipeline 10 above seabed 16. The spacing of these weighted masses 18 along pipeline 10 from buoy 20 is also determined so as to achieve the desired amount of slack with a minimum vertical deflection. In this example, the weighted masses 18 weigh 12.5 kips each (12,500 pounds) and buoy 20 has a net buoyancy of 25 kips. The location of these weighted masses 18 is approximately 300 feet from buoy 20 and the 'virtual anchor' position is approximately 7600 feet from buoy 20.

As laybarge 12 approaches undulation 22, the first weighted mass 18 is secured to pipeline 10. When this weighted mass 18 reaches stinger 14, a 12.5 kip buoy (counterbalancing the 12.5 kip weight of the weighted mass) is attached to weighted mass 18. This connection is designed for future detachment of the buoy by either a diver or a remotely operated vehicle (ROV). A length of high pressure air hose is also detachably secured to the buoy for pressurization of the buoy.

After deploying first weighted mass 18 and its attached buoy past stinger 14, the buoy is pressurized to approximately 150 psig upon reaching a depth of about 50 feet. This is usually accomplished with the aid of a diver who would operate the inlet and flood valves as well as release the air hose after pressurization is complete.

As the midpoint of the span is reached, 25 kip buoy 20 is adjusted by pre-filling with water to provide, temporarily, a net submerged buoyancy of approximately 0.5 kips. At the 300 foot mark (300 feet from where first weighted mass 18 was attached to pipeline 10), 25 kip buoy 20 is attached to pipeline 10 via a connection that can later be released by either a diver or the ROV. Before deploying buoy 20, the high pressure air hose is connected to it for later additional pressurization. During the transition from the barge to full submergence of buoy 20, the air hose is paid out till, at a depth of about 50 feet, buoy 20 is pressurized to about 100 psig.

The pipelaying process continues for approximately another 300 feet at which time the second weighted mass 18 is secured to pipeline 10. The handling procedure of this weighted mass and its respective buoy will be identical to that of the first weighted mass and buoy.

When buoy 20 is well past stinger 14 and at a depth of about 120 feet, buoy 20 is further voided till a net buoyancy of approximately 12.5 kips is realized. At this stage, a diver would close the air inlet valve and flood outlet valve on buoy 20.

Soon after the partial voiding of buoy 20, the buoy attached to first weighted mass 18 is flooded and/or vented until its buoyancy is reduced to approximately 6.5 kips at which time its flood/vent valves are closed. Before such flooding/venting occurs, however, this buoy would be at a depth of approximately 350 feet, consequently this release of pressure would normally be accomplished by the ROV as compared to a diver.

After such flooding/venting, buoy 20 is again further voided via the air hose untilits full net buoyancy of approximately 25 kips is realized. Buoy 20 is then further pressurized to an internal pressure of 500 psig before the airhose is uncoupled. This additional increase in internal pressure is to enable buoy 20 to withstand the great external pressure forces applied to it as buoy 20 is deployed into the ocean depths to support pipeline 10 above seabed 16. Since buoy 20 is within normal surface diving depths during the buoyancy manipulations, a diver is usually utilized to complete the necessary tasks.

Once buoy 20 is fully voided and pressurized, the buoy attached to first weighted mass 18 is further vented until a negligible buoyancy of 0.5 kips remains. At this point, the ROV would release this buoy from first weighted mass 18 allowing it to rise slowly to the surface where it would be recovered.

Pipelaying would proceed during these operations until the pressurized buoy attached to second weighted mass 18 is at a depth of about 150 feet. At this point, a diver would assist in flooding/venting the internal pressure until a net buoyancy of approximately 0.5 kips remains. When this step is completed, the diver would disconnect the buoy allowing it to also slowly rise to the surface for later retrieval.

Again, pipelaying, would continue while buoy 20 suspends pipeline 10 above seabed 16 as illustrated in FIG. 4. During such deflection, pipeline 10 remains axially tensioned while the laid pipeline helps anchor pipeline 10 in place. After laybarge 12 has thus progressed, the ROV is directed to buoy 20 to open its vent and flood valves so as to release its pressure and reduce its buoyancy to about 0.5 kips. When this value is reached, the vent and flood valves are closed and the ROV disconnects buoy 20 from pipeline 10. Buoy 20 then slowly rises to the surface for later recovery while pipeline 10 moves toward seabed 16 thereby releasing the axial tension in the 20 inch diameter pipeline.

Upon reaching undulation 22 and due to the slack introduced and the localized relaxation of the residual axial tension, the spanning of undulation 22 occurs as shown in FIG. 3. Afterwards, undulation 22 is inspected for any remaining spans in pipeline 10. Should any such spans be located, they would not be of the type disclosed in FIG. 2, instead they would be much shorter and smaller such that general procedures for span correction/support can be utilized.

Figure 5:
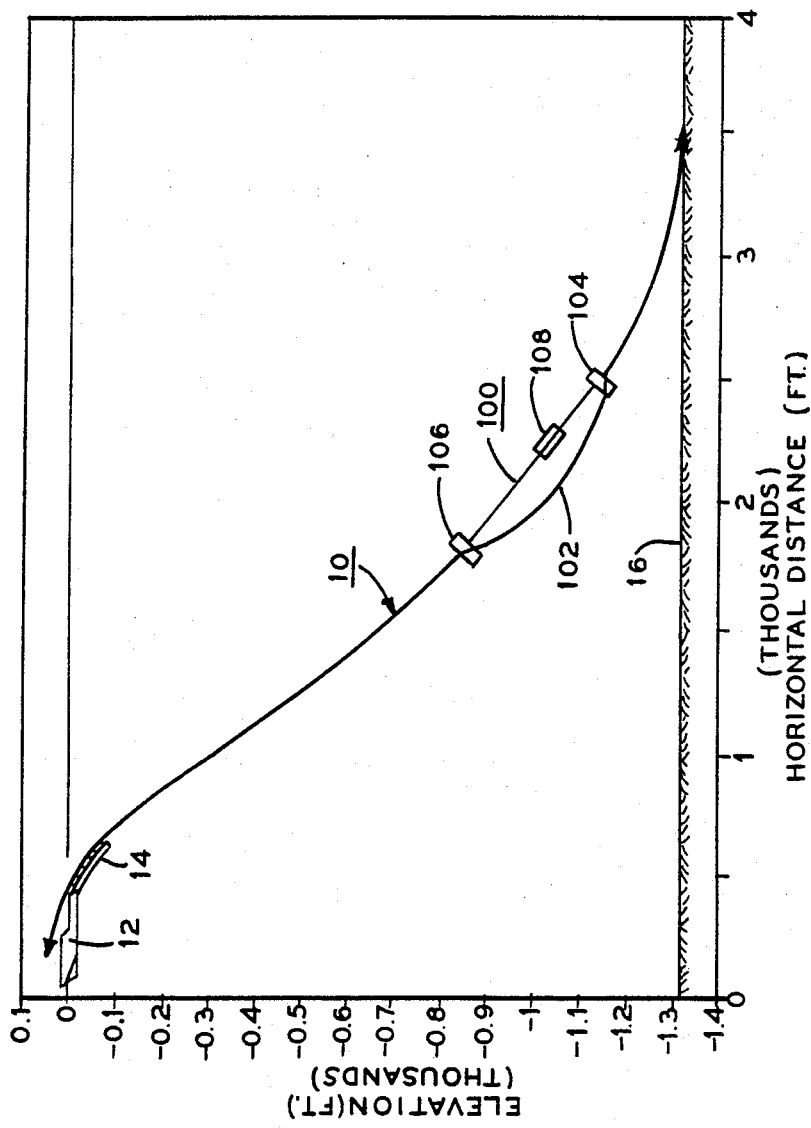
FIG. 5 is a side pictorial view of an alternate embodiment of the invention.

Referring now to FIG. 5, there is shown an alternate method of relieving tension in pipeline 10. In this embodiment, cable 100 is secured along section 102 of pipeline 10 during the pipelaying operation. First connection 104 would secure one end of cable 100 to the beginning of section 102 while second connection 106 would secure the other end of cable 100 to the opposite end of section 102. Typically, section 102 is anywhere from 300 to 1000 feet in length, more or less. First connection 104 would generally be made during the deployment of pipeline 10. Afterwards, both pipeline 10 and cable 100 would be simultaneously unreeled with cable 100 being subsequently secured to the end of section 102 via second connection 106.

When the last connection is aft of both laybarge 12 and stinger 14, cable 100 would be tensioned by reducing the cable length with turnbuckle 108 that was installed in line with cable 100. Turnbuckle 108 generally would be of the 'bolt and nut assembly with cable attachment fittings' variety which can be shortened by rotating the nut. As turnbuckle 108 is shortened, cable 100 becomes tensioned intermediate connections 104 and 106. When the length of cable 100 becomes less than the length of section 102, this portion of pipeline 10 is compressed thereby reducing any tensile forces existing in it. Continued shortening of turnbuckle 108 results in section 102 having a certain amount of slack in it which then sags or bows away from the tensioned cable. Of course, the amount of slack in section 102, the degree of tensioning of the cable 100, and the spacing of connection 104 and 106 all depend upon the circumstances of each pipelaying operation. Suffice it to say, however, that after cable 100 becomes properly tensioned, the calculated amount of slack needed to reduce or eliminate any residual axial tension from occurring in section 102 is accomplished.

After pipeline 10 and now tensioned cable 100 reach seabed 16, the cutting and/or releasing of cable 100 enables pipeline section 102 to subsequently conform to the various contours of seabed 16 as shown in FIG. 3 with little or no residual axial tension.

Figure 6:
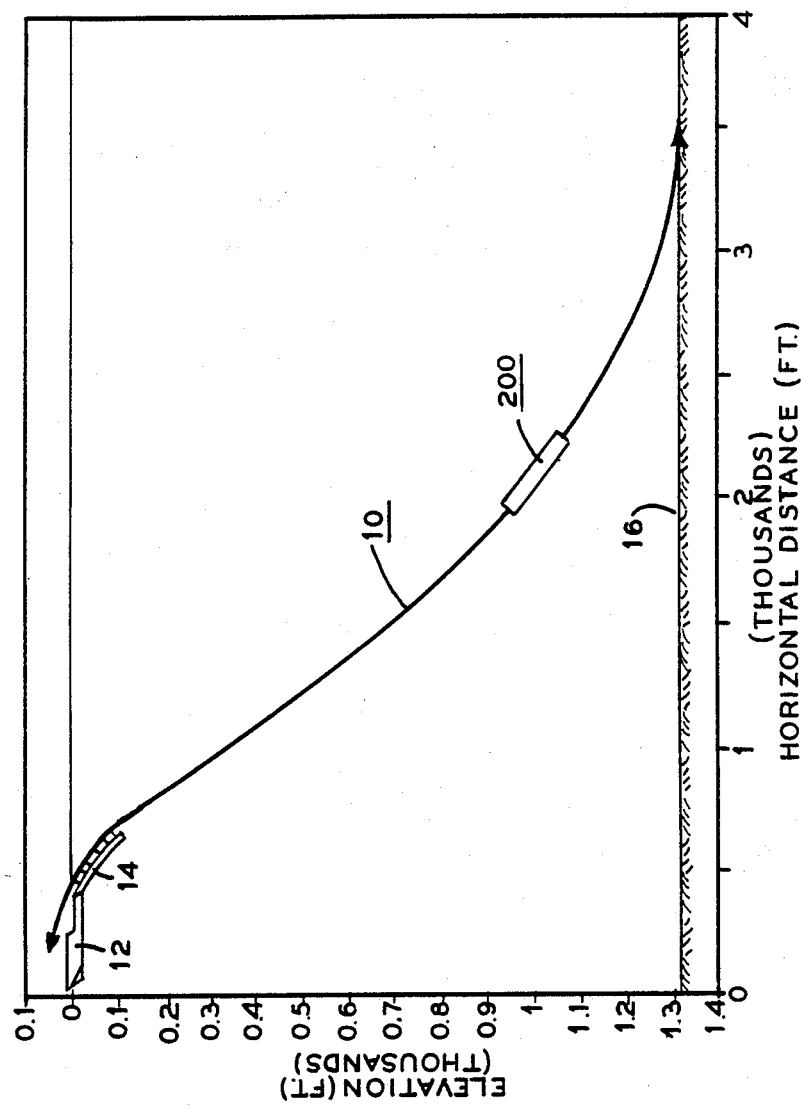
FIG. 6 is a side pictorial view of another alternate embodiment of the invention.

A third embodiment of releasing residual axial tension in an underwater pipeline is disclosed in FIG. 6. This embodiment incorporates the use of length compensating joint 200 of conventional construction. In general, length compensating joints are used in connecting subsea pipelines together where there is a need for tolerance in the length of the pipe assembly being connected. In this embodiment, length compensating joint 200 would be fully shortened or compressed before being inserted within the section of pipeline 10 to be relieved of axial tension.

After such insertion and the deployment of this section from laybarge 12, a diver or ROV would adjust, on the seabed, length compensating joint 200 to match the need. In this fashion, the amount of slack introduced to this section of pipeline 10 would be precisely the amount needed, or more if desired, and not the amount pre-calculated on a theoretical basis. The use of length compensating joint 200 is also useful should pipeline 10 stray from its intended and anticipated path. Should it be determined beforehand that a large amount of slack is required, more than one length compensating joint can be inserted within pipeline 10.

A further refinement of the above method would be to provide a slip joint that does not require a diver's assistance in order to be activated. This slip joint would automatically release once on the bottom thereby enabling pipeline 10 to automatically take up the position as shown in FIG. 3.

What is claimed as invention is:

1. A method of locally supplying slack to an axially tensioned pipeline being laid in a marine environment comprising the steps of:
    (a) deploying pipeline to an undulating seabed across which said pipeline will span;
    (b) selecting a certain length of said pipeline to which slack will be provided;
    (c) vertically deflecting above said seabed a mid-region of said selected length while said pipeline is being deployed, said vertical deflection maintaining axial tension in said pipeline;
    (d) anchoring opposite ends of said selected length to said seabed, the distance between said opposite ends along said undulating seabed being less than that along said vertically deflected pipeline; and,
    (e) diminishing said vertical deflection of said mid-region of said selected length thereby locally releasing said axial tension in and introducing slack to said selected length of said pipeline.

2. The method as set forth in claim 1 wherein said step of selecting a certain length of said pipeline comprises the further step of basing said selected length upon the unsupported span length of said pipeline and its height above said seabed.

3. The method as set forth in claim 2 further comprising the step of securing a buoy to said pipeline, the buoyancy of said buoy being selectively adjusted to thereby control the axial tension in said selected length of said pipeline.

4. The method as set forth in claim 3 further comprising the step of reducing the buoyancy of said buoy thereby eliminating the buoyancy force applied to said pipeline.

5. The method as set forth in claim 4 further comprising the step of detachably securing said buoy to said pipeline and subsequently detaching said buoy from said pipeline.

6. The method as set forth in claim 5 further comprising the step of adding additional weight to said pipeline to minimize the vertical deflection required to achieve the desired slack while also utilizing the frictional forces between said pipeline and said seabed to retain said pipeline in place.

7. The method as set forth in claim 6 further comprising the steps of:
    (a) affixign a first weighted mass to said pipeline adjacent a leading edge of said selected length;
    (b) affixing a second weighted mass to said pipeline adjacent a trailing edge of said selected length; and,
    (c) selecting the spacing of said first and second weighted masses such that the vertical deflection required to achieve the desired amount of slack is minimized, said second weighted mass being spaced from said first weighted mass along said seabed a distance less than that between them along said pipeline.

8. A method of locally relieving axial tension in an underwater pipeline comprising the steps of:
    (a) deploying pipeline to an undulating seabed, wherein a span of said pipeline crosses an undulation on said seabed;
    (b) affixing a first weighted mass to said pipeline adjacent a first end region of said span;
    (c) affixing a second weighted mass to said pipeline at a location spaced from said first weighted mass and adjacent a second end region of said span;
    (d) securing an adjustable buoyant member to said pipeline at a mid-region of said span intermediate said first and second weighted masses;
    (e) suspending said pipeline at said mid-region of said span by said buoyant member above said undulating seabed thereby maintaining axial tension in said pipeline;
    (f) positioning said first and second weighted masses on opposite sides of said undulation to be crossed thereby minimizing the vertical deflection required to achieve the desired slack; and,
    (g) reducing the net buoyancy of said buoyant member thereby lowering said suspended pipeline while locally relieving axial tension in said pipeline as it comes to rest across said undulating seabed.

9. The method as set forth in claim 8 further comprising the steps of:
    (a) temporarily supporting said first weighted mass underwater by a first buoy secured adjacent said first weighted mass;
    (b) temporarily supporting said second weighted mass underwater by a second buoy secured adjacent said second weighted mass; and,
    (c) suspending said pipeline by said buoyant member and said first and second buoys.

10. The method as set forth in claim 9 further comprising the step of detachably securing said first and second buoys adjacent their respective first and second weighted masses.

11. The method as set forth in claim 10 further comprising the step of adjusting the buoyancy of said buoyant member and said first and second buoys as needed for deployment of said pipeline.

12. The method as set forth in claim 11 further comprising the step of adjusting the buoyancy of said buoyant member and said first and second buoys by selective voiding and flooding operations.

* * * * *